United States Patent [19]

Bouvot

[11] Patent Number: 4,665,799
[45] Date of Patent: May 19, 1987

[54] CONTROL DEVICE FOR AN ACTUATOR FOR MOVING A MEMBER WHICH IS MOVABLE BETWEEN TWO POSITIONS, IN PARTICULAR FOR A HEATER OR AIR CONDITIONING INSTALLATION FOR THE CABIN OF A MOTOR VEHICLE

[75] Inventor: Jean-Francois Bouvot, Dampierre, France

[73] Assignee: Valeo, Paris, France

[21] Appl. No.: 790,444

[22] Filed: Oct. 23, 1985

[30] Foreign Application Priority Data

Nov. 8, 1984 [FR] France .................. 84 17037

[51] Int. Cl.[4] ............................. F15B 9/10
[52] U.S. Cl. .................. 91/375 R; 91/376 R; 98/2; 137/625.21
[58] Field of Search ............... 91/186, 375 R, 376 R, 91/381; 137/625.21, 865; 98/2, 40.3

[56] References Cited

U.S. PATENT DOCUMENTS

| 683,427 | 10/1901 | Bargea | 91/376 |
|---|---|---|---|
| 2,380,369 | 7/1945 | Nix | 91/375 X |
| 2,837,115 | 6/1958 | Bancroft | 137/865 X |

FOREIGN PATENT DOCUMENTS

| 2195933 | 2/1974 | France . |
| 2375523 | 7/1978 | France . |
| 2536124 | 5/1984 | France . |
| 2064825 | 6/1981 | United Kingdom . |

OTHER PUBLICATIONS

Patent Abstracts of Japan, vol. 4, No. 161 Japan 55-110617 1980.

Primary Examiner—Robert E. Garrett
Assistant Examiner—Mark A. Williamson
Attorney, Agent, or Firm—Dennison, Meserole, Pollack & Scheiner

[57] ABSTRACT

The invention relates to a control device for a moving member such as a flap (20) under the control of an actuator (24a) which is supplied with fluid under pressure and connected to an exhaust by means of a slide valve (10a) which includes three elements (12a, 14a, and 15a) one of which moves with the flap (20a), another of which is movable under manual control (30a), and the third of which is fixed and forms the connection to a source of fluid under pressure and to the exhaust. The invention may be used, in particular, for controlling the flaps in an installation for heating or for air conditioning the cabin of a motor vehicle.

9 Claims, 25 Drawing Figures

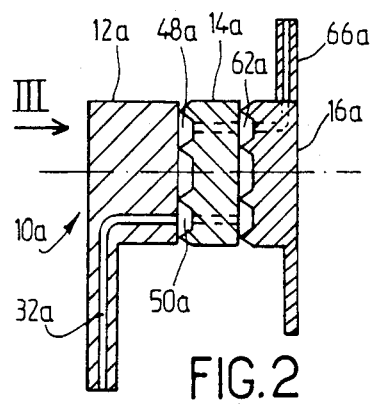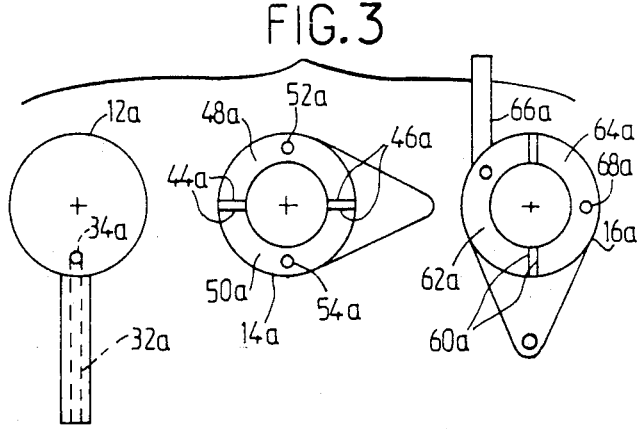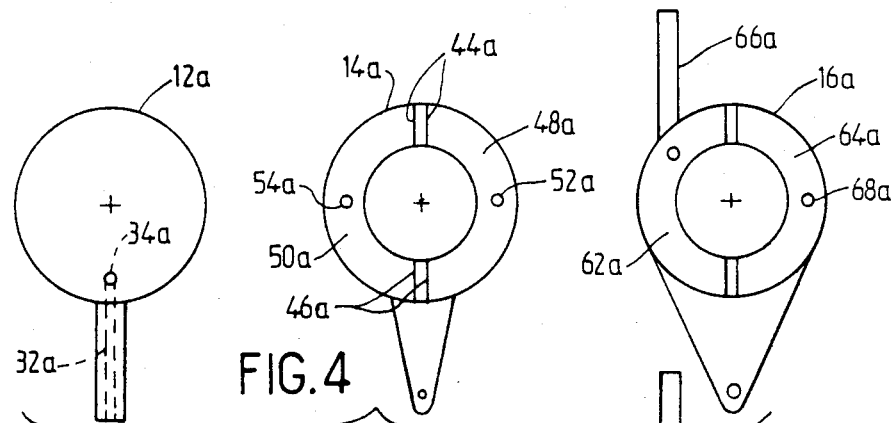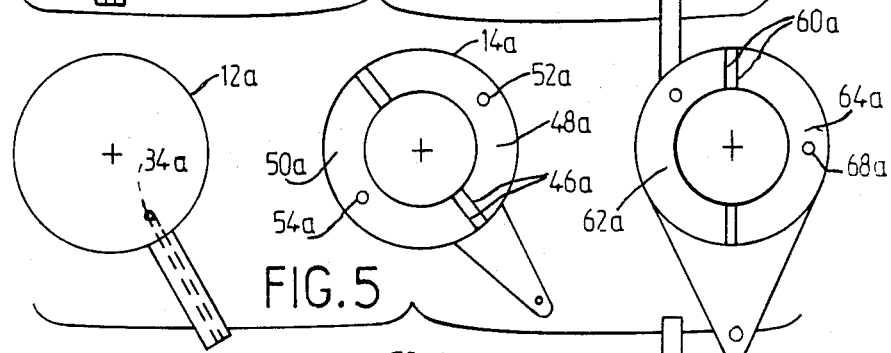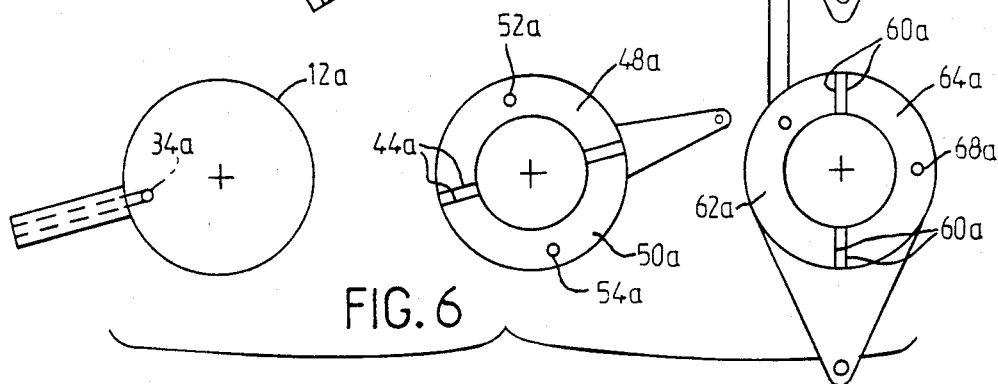

CONTROL DEVICE FOR AN ACTUATOR FOR MOVING A MEMBER WHICH IS MOVABLE BETWEEN TWO POSITIONS, IN PARTICULAR FOR A HEATER OR AIR CONDITIONING INSTALLATION FOR THE CABIN OF A MOTOR VEHICLE

The invention relates to a control device for an actuator for moving a member which is movable between two limit positions, the control device being of the type in which the actuator is fed with fluid under pressure by means of a slide valve.

SUMMARY OF THE INVENTION

Such a device is used, in particular, in the automobile industry, for example for controlling displacement of a flap which is a part of a heater and ventilation installation or of an air conditioning installation for the cabin of a motor vehicle. Unlike conventional controls where the flap is rotated about an axis by a cable connected to a control lever mounted on the vehicle dashboard, a control device for controlling displacement of a flap by means of an actuator which is fed with fluid under pressure from a slide valve has the advantage that in the event of a breakdown, or when the source of fluid under pressure is turned off, the actuator is automatically in a pressure-exhausting position and the associated flap is returned to a privileged or safety position. In addition, the force exerted on the control member for the slide valve from the vehicle dashboard is much more even and much smaller than the force required for direct control using a cable or wire.

Control devices of this type are already known in which the slide valve for distributing fluid under pressure comprises a first moving element which is fixed to the member to be displaced (eg. a flap) or to the piston rod of the control actuator, and a second moving element which is mounted in a sealed manner on the first in order to define therewith a plurality of chambers which are connected to the source of fluid under pressure and to an exhaust, the first moving element of the slide valve is connected by a duct to the actuator supply, and the second moving element is displacable relative to the first by means of a direct cable control from the vehicle dashboard. The member to be displaced, e.g. a flap, is thus of the follower type, i.e. its displacement is directly proportional to the displacement of the control means on the dashboard and is constantly synchronized with the displacement of this control means.

However, in some cases it is necessary for the displacement of the flap to be other than directly proportional to the displacement of control means on the dashboard, for example the flap may be required to follow a path between its limit positions in accordance with a predetermined displacement relationship when the control means on the dashboard is displaced from one of its limit positions to the other.

The invention enables a cheap, effective and simple solution to be provided to this problem.

The invention also enables a control device of this type to displace two flaps with different motions from a single control on the dashboard.

SUMMARY OF THE INVENTION

The invention provides a device for controlling an actuator for displacing a moving member which is movable between two limit positions, the actuator being fed with fluid under pressure from a slide valve comprising a first element connected to the piston rod of the actuator in conjunction with the moving member and synchronously displacable therewith, a second element mounted in sealed relationship on the first element, a control for displacing the second element between predetermined positions, said two elements defining therebetween a plurality of chambers which are separated from one another in a sealed manner and which are suitable both for being selectively connected to a source of fluid under pressure and to an exhaust via the second element and are also for being connected to a feed duct to the actuator via the first element, the device including the improvement whereby the second element of the slide valve is associated in a sealed manner with a third, fixed element with which it defines at least two chambers which are separated from each other in sealed manner, one of which is permanently connected to a source of fluid under pressure and the other of which is permanently connected to the exhaust via the third element of the slide valve.

This device makes it possible to completely dissociate the movement of the manual control means from the movement of the controlled member, e.g. a flap, which is displaced by the actuator. The moving member, e.g. a flap, may thus be displaced in a relatively complex motion while the control lever is displaced in a single direction passing through predetermined positions which are advantageously equidistant from one another, thereby simplifying control of the installation for the user.

The moving elements of the slide valve are preferably coaxial disks mounted to rotate about a common axis, or else they are plates which are displacable in translation relative to one another in a predetermined direction.

Advantageously, the second element of the slide valve constitutes the drive member of the second element of a second slide valve of the same type, which second slide valve is suitable for controlling the displacement of a second moving member between two limit positions via a second actuator.

When the moving elements of the slide valves are coaxial disks mounted to rotate about their common axes the outer peripheral surfaces of the second moving elements of the slide valves are provided with gear teeth which mesh with one another.

Thus, a single control on the dashboard can be used to drive the second moving element of a first slide valve to cause it to rotate about its axis in one direction or the other, and this rotary movement is transmitted by the meshing teeth to the second moving element of the other slide valve.

The single control can then be used to cause two moving members to be displaced with different motions that are not necessarily synchronized.

BRIEF DESCRIPTION OF THE DRAWINGS

Embodiments of the invention are described by way of example with reference to the accompanying drawings, in which:

FIG. 2 is a diagrammatic axial section through a fluid-distributing slide valve in accordance with the invention;

FIG. 3 is a view along arrow III of FIG. 2, showing the three elements of the slide valve;

FIGS. 4, 5, and 6 are similar views to FIG. 3 showing the operation of the slide valve;

MORE DETAILED DESCRIPTION

Figure 1:
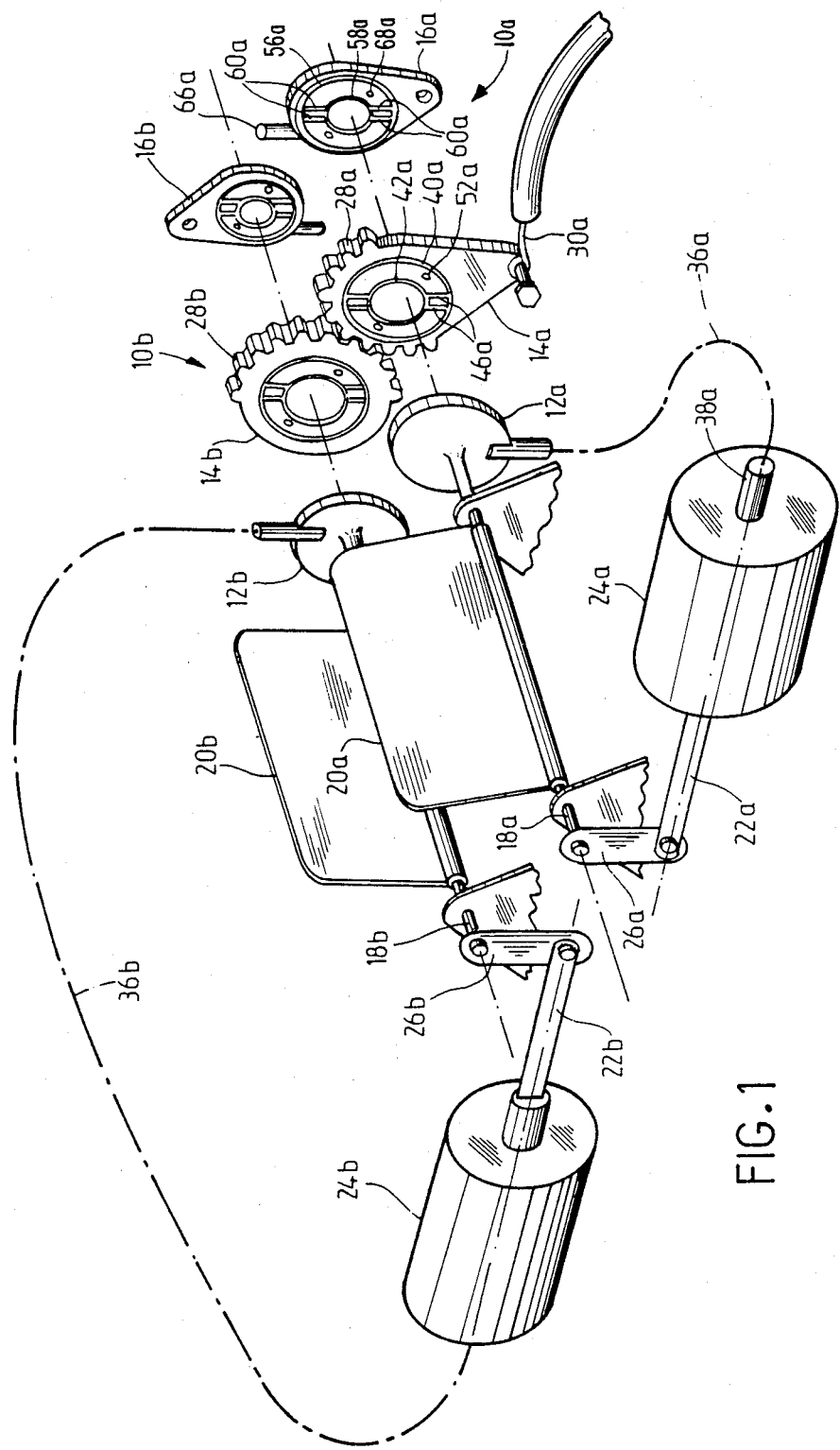
FIG. 1 is a diagrammatic exploded perspective view of a control device in accordance with the invention.

Reference is made initially to FIGS. 1 to 3 which show a device in accordance with the invention used for controlling the displacement of two flaps in an installation for heating and ventilating or for airconditioning the cabin of a motor vehicle.

In this case, the source of fluid under pressure is a source of air at reduced pressure, i.e. air at a pressure which is less than atmospheric pressure, since such a source is in any case available on the internal combustion engine with which the motor vehicle is equipped.

The control device comprises two slide valves for distributing fluid under pressure $10a$ and $10b$, and these slide valves are shown in an exploded view to demonstrate that each of them comprises three elements $12a$, $14a$, $16a$ and $12b$, $14b$ and $16b$ respectively. The first elements $12a$ and $12b$ of the slide valves are each fixed to a rotary shaft $18a$ or $18b$ of a corresponding flap $20a$ or $20b$ which is driven to rotate by a piston rod $22a$, $22b$ of a single action actuator $24a$, $24b$ via a respective crank $26a$ and $26b$, having one end fixed to the corresponding shaft and having its other end articulated to the end of the corresponding piston rod.

All three elements of the slide valves $10a$ and $10b$ for distributing fluid under pressure have the general shape of flat circular disks, with the first and second elements being movable to rotate about the axis of rotation of the shaft of the corresponding flap, while the third elements $16a$ and $16b$ of the slide valves are fixed.

The second elements $14a$ and $14b$ are formed with outwardly projecting gear teeth $28a$ and $28b$ respectively round at least a portion of their peripheries, which gear teeth are meshed with one another as shown in FIG. 1. The second element $14a$ of slide valve $10a$ further includes a radially outwardly directed finger or crank by which it is connected to the end of a control cable $30a$ whose other end (not shown) is connected to control means on the dashboard of the vehicle.

The third elements $16a$ and $16b$ of the slide valves, i.e. the fixed elements, are also provided with respective outwardly projecting fingers or cranks to enable the slide valves to be fixed in a predetermined angular position about the axis of rotation of the corresponding flap $20a$, or $20b$.

As can be seen more clearly in FIG. 2, which is an axial section through the slide valve $10a$ in the assembled condition, all three elements of each slide valve are mounted coaxially and in sealed relationship to one another in such a manner as to define therebetween a plurality of chambers which are separated from one another in sealed manner and which are selectively connected to one another as a function of the angular positions of the two moving elements of the slide valve.

The first moving element $12a$ of the slide valve is formed with a duct $32a$ having one end opening out via an orifice $34a$ into the circular face of said element and opposite the corresponding circular face of the second moving element $14a$, and whose other end is connected via a duct $36a$ to the supply or exhaust fitting $38a$ of the actuator $24a$. The face of the second moving element $14a$ which looks at the first moving element $12a$ is formed with two circular and concentric sealing lips $40a$ and $42a$ which are centered on the axis of rotation and which are crossed by two pairs of sealing lips $44a$ and $46a$ which extend radially over the distance between the concentric circular lips $40a$ and $42a$ in such a manner as to define, in conjunction with the facing circular face of the first element $12a$, two chambers $48a$ and $50a$ which are separated from each other in a sealed manner by the said radial lips. The orifice $34a$ of the duct $32a$ through the first moving element opens out between the two concentric lips $40a$ and $42a$, i.e. either into the chamber $48a$, or into the chamber $50a$, or else between one or other of the pairs of radial lips $44a$ and $46a$ which are set apart from one another by a distance which is greater than the diameter of the orifice $34a$.

The chambers $48a$ and $50a$ formed on one face of the second moving element $14a$ are connected to the other face thereof via respective holes $52a$ and $54a$ which pass through the said moving element parallel to its axis of rotation.

The face of the third element $16a$ of the slide valve which faces the second element $14a$ is likewise formed with two circular and concentric sealing lips $56a$ and $58a$ which are centered on the axis of rotation, together with two pairs of sealing lips $60a$ which extend radially between the concentric lips $56a$ and $58a$. These sealing lips are applied against the facing face of the second moving element $14a$, thus defining two chambers $62a$ and $64a$ which are sealed from each other, with the chamber $62a$ being connected via a duct $66a$ through the third element to the source of fluid under pressure, and with the chamber $64a$ being connected to an exhaust via a hole $68a$ which goes through the third element $16a$ of the slide valve.

The structure of the other slide valve $10b$ is essentially identical to that of the above-described slide valve $10a$, except insofar as the relative positions of the various chambers with respect to one another are modified so that the motions of the flaps $20a$ and $20b$ are not identical, as described in greater detail below.

FIGS. 3 to 11 show the three elements of a slide valve in simplified form in order to simplify the description of their operation.

Reference is now made to FIGS. 4 to 6 to describe the operation of a first embodiment of a slide valve in accordance with the invention, and in particular of the slide valve $10a$ which is associated with the actuator $24a$ and with the flap $20a$.

In this embodiment, the pairs of radial sealing lips on the second and third elements of the slide valve are diametrically opposed so that the chambers $48a$, $50a$, $62a$ and $64a$ of this slide valve all extend over substantially the same arc.

The position shown in FIG. 4 is a stable position with the orifice $34a$ of the feed duct $32a$ to the actuator $24a$ located between two adjacent radial lips $46a$ on the second element $14a$, and is thus isolated from the source of fluid under pressure and also from the exhaust. In this position, the chamber $50a$ formed between the elements $12a$ and $14a$ communicates via the hole $54a$ with the chamber $62a$ which is formed between the second element $14a$ and the third element $16a$ of the slide valve and which is connected to the source of fluid under pressure. The other chamber $48a$ which is formed between the first and second elements of the slide valve communicates via the hole 52a with the other chamber 64a which is formed between the second and third elements of the slide valve, and which is connected via the hole 68a to the exhaust.

If, starting from the FIG. 4 position, the second element 14a of the slide valve is displaced under manual control to the position shown in FIG. 5, the orifice 34a of the actuator feed duct leaves the isolation zone formed between the pair of radial lips 64a on the second element 14a and opens out into the chamber 50a which is connected via the hole 54a and the chamber 62a to the source of fluid under pressure. The actuator 24a is thus supplied with fluid under pressure (i.e. in the present case of a motor vehicle, with air at a pressure of less than atmospheric pressure) such that the piston rod 22a is retracted into the actuator 24a and the flap 20a rotates together with the first element of the slide valve 12a in the same direction of rotation as the second element 14a thereof, and it continues to rotate in this direction until the orifice 34a of the actuator feed duct returns to the isolation zone formed between the pair of radial lips 46a. Under such conditions the displacement of the flap is identical to the displacement of the second element 14a of the slide valve and is thus directly proportional to the displacement of the control means on the dashboard, which displacement is transmitted to the element 14a by the control cable 30a.

This proportionality of motion continues until the rotation of the second element 14a of the slide valve is such that the hole 54a through the second element which moves along the chamber 62a formed between the second and third elements, moves beyond the pair of radial lips 60a of the third element and thus arrives in the chamber 64a which is permanently connected to the exhaust via the hole 68a through the third element of the slide valve. The actuator 24a is then connected to the exhaust instead of being supplied with fluid under pressure, thus causing the piston rod 22a to move out from the actuator and cause the flap 20a to move in the opposite direction. This rotation in the opposite direction continues until the flap 20a abuts against a fixed wall, or else until the piston rod 22a has moved to its maximum extension from the actuator 24a. The corresponding position of the first element 12a of the slide valve is shown in FIG. 6. The movement of the flap may also be stopped when the orifice 34a of the actuator feed duct returns to the isolation zone formed between the pair of radial lips 44a in the second element of the slide valve, which is the case shown in FIG. 6.

Reference is now made to FIGS. 7 to 11 which illustrate the operation of another embodiment of a slide valve in accordance with the invention.

This embodiment differs from the embodiment shown in FIGS. 4 to 6 in that the pairs of radial sealing lips on the second element 14a of the slide valve which separate the chambers 48a and 50a are no longer directly opposed, such that the chamber 50a extends over a much smaller arc than the chamber 48a. In addition, on the third element 16a of the slide valve, the chamber 64a which is connected to the exhaust extends over a much larger arc than does the chamber 62a which is connected to the source of fluid under pressure, but with these two chambers being separated from each other by a first and second pairs of adjacent radial lips 60a and 70a which are not diametrically opposed to each other.

Figure 7:
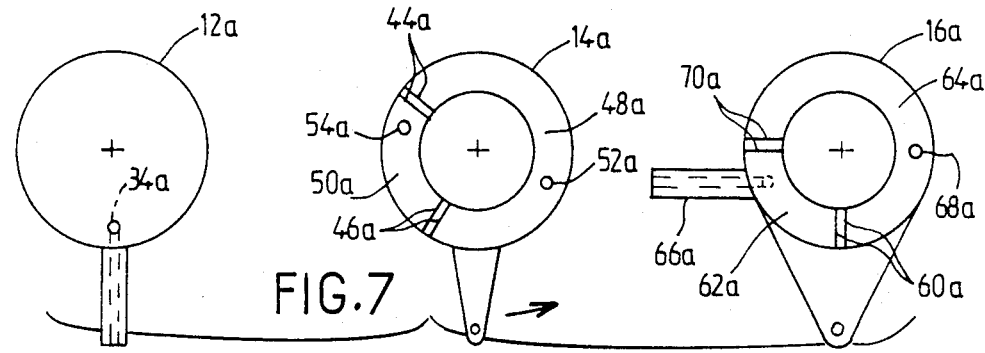
FIGS. 7 to 11 are similar views to FIG. 3, but showing the operation of a variant embodiment of a slide valve in accordance with the invention.
Figure 8:
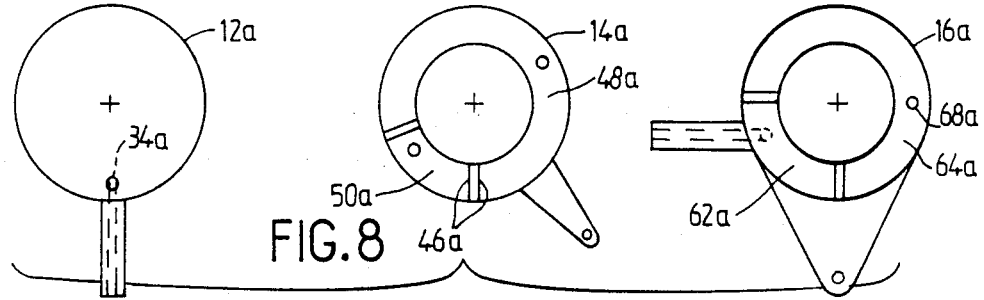
Figure 9:
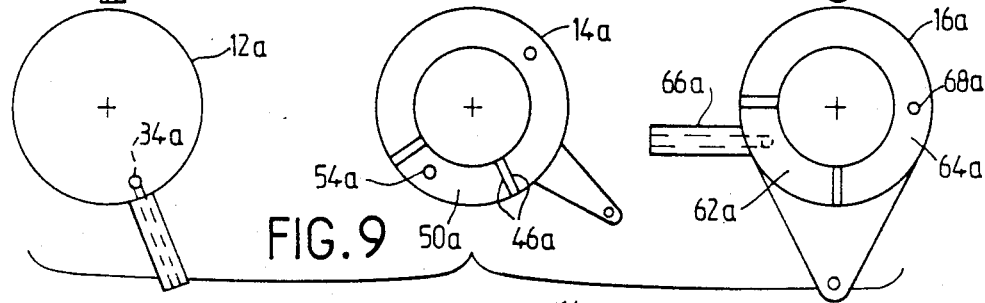

In the position shown in FIG. 7, the flap and thus the first element 12a of the slide valve are in a limit position corresponding to the actuator 24a being connected to the exhaust. The orifice 34a of the actuator feed duct opens out into the chamber 48a formed between the first element 12a and the second element 14a of the slide valve, with the chamber 48a being connected via the hole 52a to the chamber 64a formed between the second and third elements of the slide valve, and with the chamber 64a being connected to the exhaust via the hole 68a through the third element of the slide valve.

Starting from the position shown in FIG. 7, rotation of the second element 14a of the slide valve caused by the control means on the dashboard being displaced takes place in the direction of the arrow shown in FIG. 7, and has no effect until the radial sealing lips 46a of the second element 14a come opposite the orifice 34a of the actuator feed ducts. This is the position shown in FIG. 8.

If the element 14a continues to be rotated in the same direction (FIG. 9), the orifice 34a of the actuator feed duct then opens out into the chamber 50a which is formed between the first and second elements of the slide valve, which chamber 50a is in communication via the hole 54a with the chamber 62a which is in turn connected to the source of fluid under pressure. The actuator 24a is thus fed with fluid under pressure (which in the present case is air at a pressure of less than atmospheric pressure) thereby causing the piston rod 22a to be withdrawn into the actuator and rotating the flap 20a and the first element 12a of the slide valve in the same direction as the second element 14a of the slide valve has been rotated by the control means. This actuator-driven rotation continues until the orifice 34a of the actuator feed duct returns to the isolation zone formed between the pair of radial lips 46a of the second element of the slide valve. During this phase, displacement of the flap is identical to the displacement of the second element 14a of the slide valve, and is thus proportional to the displacement of the control means on the dashboard.

Figure 10:
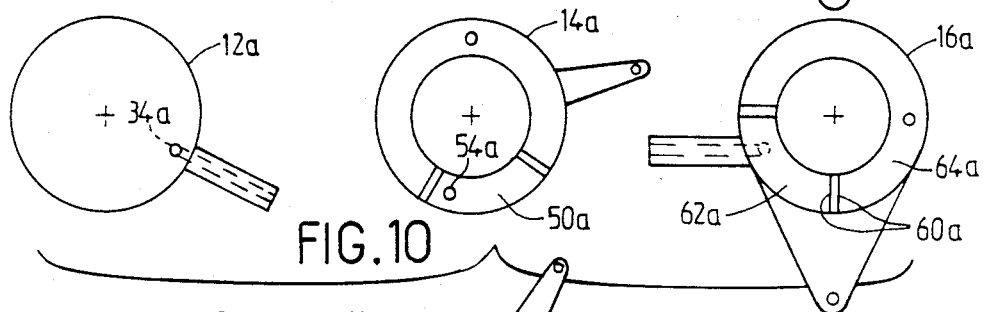

This continues until the angular position of the second element 14a of the slide valve is as shown in FIG. 10, with the hole 54a passing through the second element 14a opening out into the isolation zone formed between the pair of radial lips 60a of the third element 16a of the slide valve.

Figure 11:
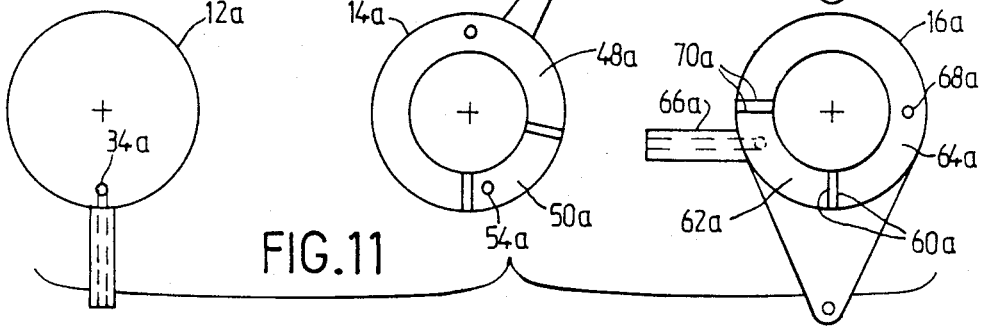

If, starting from this position, the second element 14a continues to rotate in the same direction as shown in FIG. 11, the hole 54a passing through said second element now connects the chamber 50a to the chamber 64a which is connected to the exhaust, thus causing the actuator feed duct orifice 34a which opens out into the chamber 50a to connect the actuator to the exhaust. The flap 20a and the first element 12a of the slide valve are then rotated in the opposite direction to the direction of rotation of the second element 14a of the slide valve and return to their initial limit position corresponding to the position shown in FIG. 7.

It will be understood that in the FIG. 1 device, one of the slide valves may have a structure which corresponds to that shown in FIGS. 4 to 6 while the other slide valve has a structure of the type which corresponds to FIGS. 7 to 11. In this case, the motions of the two flaps are synchronized only for a portion of the stroke of the control means on the dashboard and are completely dissociated from each other for the remainder of the stroke of said control means.

Reference is now made to FIGS. 12 to 16 which show a variant embodiment of a slide valve in accordance with the invention, in which variant the elements of the slide valve are no longer coaxial disks with two of the disks being rotatable about a common axis, but are now constituted by a stack of plane plates, with the first two plates being displacable in translation in a their respective planes.

More precisely, the slide valve comprises a first element 72 which includes a tubular end fitting 74 opening out through its upper face and intended to be connected to the feed orifice of the actuator for displacing a flap. The second element 76 of the slide valve is shaped on its face which faces the first element 72 with sealing lips 78 which define, together with the upper face of the first element 72, two chambers 80 and 82 which are separated from each other in a sealed manner by a pair of sealing lips which define an isolation zone 84 which is wider than the diameter of the tubular end fitting 74 where it opens out through the plane face of the first element. Two holes 86 and 88 are formed through the second element 76 and open out into respective ones of the chambers 80 and 82.

The third element 90 of the slide valve is a fixed plate which is applied against the upper face of the second element 76 and which is provided with two pairs of sealing lips 92 which define a chamber 94 which is connected via a tubular end fitting 96 to the source of fluid under pressure, and which define respective isolation chambers on either side of the chamber 94.

Figure 12:
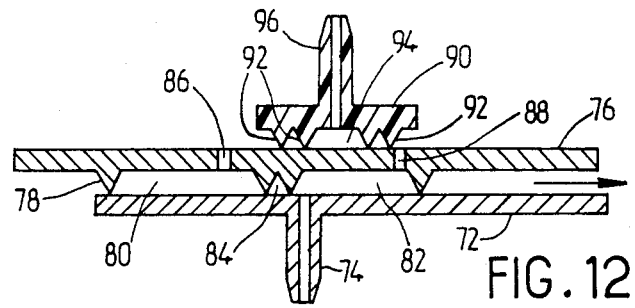
FIGS. 12 to 16 are diagrammatic section views showing the operation of another variant embodiment of a slide valve in accordance with the invention.

The plates 72 and 76 are movable in translation parallel to their planes, as shown by the arrow in FIG. 12, with the plate 72 being displaced by the piston rod of the associated actuator and with the plate 76 being displaced by the control cable which is connected to the control means on the dashboard.

In the position shown in FIG. 12, the tubular end fitting 74 of the first plate 72 which is connected to the actuator supply inlet opens out into the chamber 82 which is connected via the hole 88 to the atmosphere, i.e. to the exhaust. The actuator is thus in its exhaust position and the position shown for the first plate 72 is a limit position, which corresponds to a limit position of the flap to be displaced.

Figure 13:
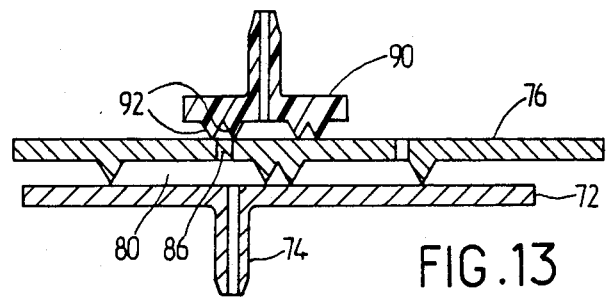

If, starting from the position shown in FIG. 12, the second plate 76 is displaced to the right as shown in FIG. 13, the tubular end fitting 74 of the first plate 72 is initially closed by the isolation chamber 84 and then opens out into the chamber 80 whose hole 86 opens out in turn into the gap between an adjacent pair of lips 92 in the third plate 86, and is thus isolated from the exhaust or from the source of fluid under pressure. Consequently, this displacement of the second plate 76 has no effect on the actuator and the flap is not moved. The first plate 72 remains in the same position as shown in FIG. 12.

Figure 14:
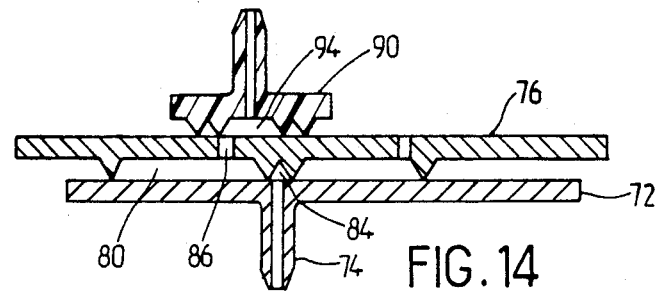

If, starting from the position shown in FIG. 13, the second plate 76 is further displaced a small distance to the right (as shown in FIG. 14) the hole 86 from the chamber 80 opens out into the chamber 94 which is connected to a source of fluid under pressure. The actuator is then supplied with fluid under pressure via the chamber 80 and the tubular end fitting 74, and thus causes the first plate 72 to move towards the right until the orifice of the tubular end fitting 74 reaches the isolation zone 84. Thus, a small displacement of the second plate 76 gives rise to a much larger displacement of the first plate 72, and thus of the associated flap.

Figure 15:
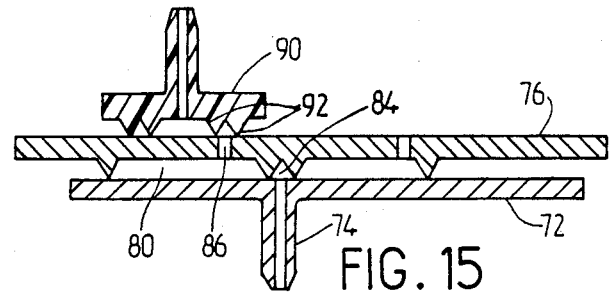

If, starting from the position shown in FIG. 14, the plate 76 is further displaced to the right by the control means, the first plate 72 is displaced identically to the second plate 76 until the position shown in FIG. 15 is reached where the hole 86 through the second plate 76 is again located between a pair of adjacent lips 92 on the third plate 90 and is thus isolated from the exhaust and from the source of fluid under pressure.

Figure 16:
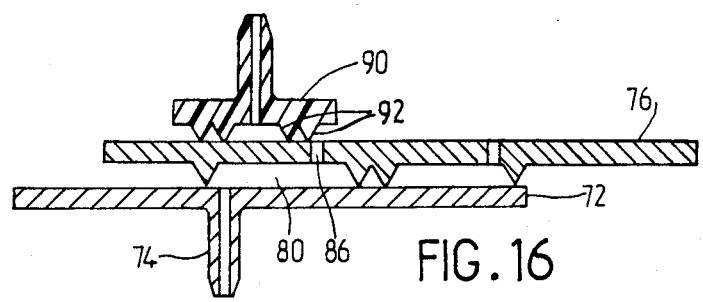

If, starting from the position shown in FIG. 15, the second plate 76 is further displaced to the right, as shown in FIG. 16, the hole 86 through said second plate opens out to the atmosphere, i.e. to the exhaust, and the actuator is connected to the exhaust via the chamber 80 and the tubular end fitting 74, thus causing the first plate 72 to be moved to the left until it comes into abutment, i.e. until it returns to its initial position as shown in FIGS. 12 and 13. As a result the corresponding flap is likewise returned to its initial position.

Naturally, displacing the second plate 76 in the opposite direction, i.e. to the left in the drawings, starting from the position shown in FIG. 16 causes the first plate 72 and thus the associated flap to move through the opposite sequence of movements to that which has just been described, with the plate 72 returning to its FIG. 15 position, and then to its FIG. 14 position and finally to its position as shown in FIGS. 12 and 13.

Reference is now made to FIGS. 17 to 25 which show another variant embodiment of a slide valve in accordance with the invention, with identical first and second elements 72 and 76 to those described with reference to FIGS. 12 and 16.

The third element 100 of this variant is a fixed plate provided with pairs of sealing lips which are applied against the upper face of the second element 76 to define two chambers 102 and 104 which are connected to the source of reduced pressure via respective tubular end fittings 106 and 108, together with an intermediate chamber 110 which is located between the chambers 102 and 104 and which is connected to the exhaust via a hole 112 passing through the third plate.

As in the preceding embodiment, the plates 72 and 76 are movable in translation parallel to their planes, with the plate 72 being displaced by the piston rod of the associated actuator and the plate 76 being displaced by a cable connected to control means on the dashboard.

Figure 17:
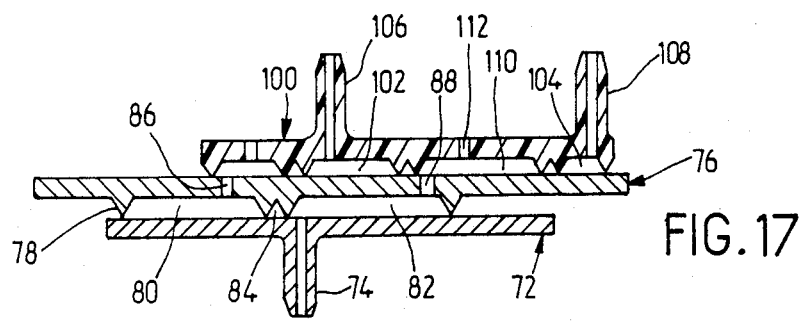
FIGS. 17 to 25 are diagrammatic section views showing the operation of another variant of the invention.

In the FIG. 17 position, the tubular end fitting 74 of the plate 72 is connected to exhaust via the chamber 82, the hole 88, the chamber 110, and the hole 112. The associated actuator is thus connected to the exhaust and the position shown for the plate 72 is a limit position corresponding to a limit position of the flap to be displaced, which flap is thus against an abutment.

Figure 18:
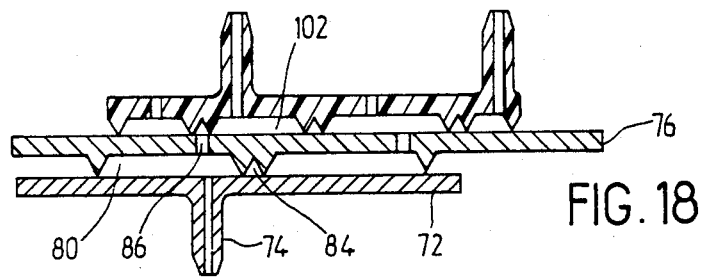

If, starting from this position, the plate 76 is displaced to the right as shown in FIG. 18 until the hole 86 moves into the isolation chamber on one side of the chamber 102, the tubular end fitting 74 of the first plate 82 is closed by the isolation chamber 84 and then opens out into the chamber 80 whose hole 86 is initially connected to the exhaust prior to moving into said isolation chamber situated adjacent to the chamber 102. The actuator is then no longer supplied with reduced pressure, the position of the flap does not change, and the plate 72 remains in the same position as shown in FIG. 17.

Figure 19:
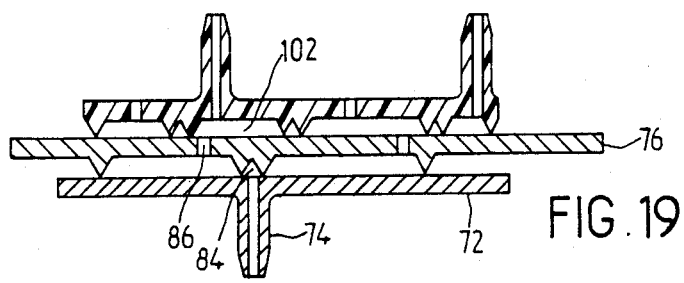

If the second plate 76 is then moved a little further to the right, as shown in FIG. 19, the hole 86 opens out into the chamber 102 which is connected to the source of reduced pressure and the actuator is thus supplied with reduced pressure. As a result the first plate 72 is displaced to the right until the outlet from the tubular end fitting 74 moves into the isolation chamber 84. Thus, a small displacement of the plate 76 gives rise to a much larger displacement of the plate 72 and thus of the associated flap.

Figure 20:
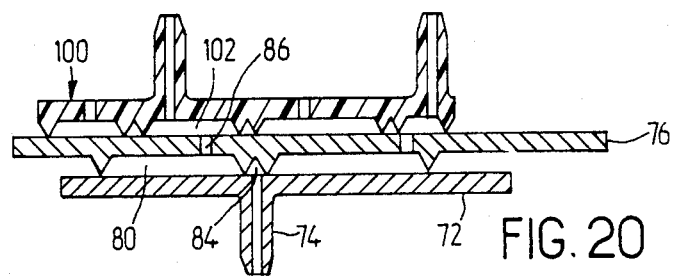
Figure 21:
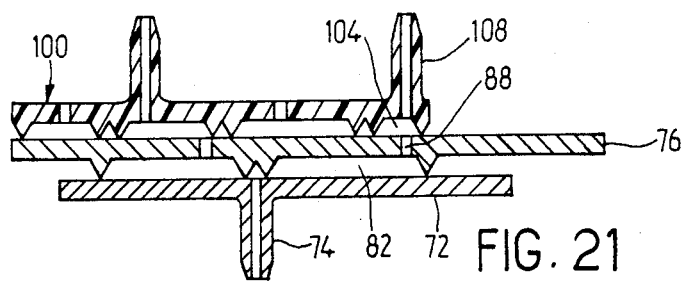

If the second plate 76 is then moved further to the right, as shown in FIGS. 20 and 21, the first plate 72 is displaced to the right in the same manner as the second plate 76 until it arrives at an end-of-stroke position as shown in FIG. 21, where the flap is in abutment and in a limit position. It may be observed that in the FIG. 21 position the other hole 88 of the second plate 76 opens out into the other chamber 104 which is connected to the source of reduced pressure via the tubular end fitting 108.

Thus, if the plate 76 is displaced in the opposite direction, i.e. to the left, the actuator is supplied with reduced pressure via the end fitting 74, the chamber 82, the hole 88 and the chamber 104, and the plate 72 thus moves to the right unless it is already in the corresponding limit position.

Figure 22:
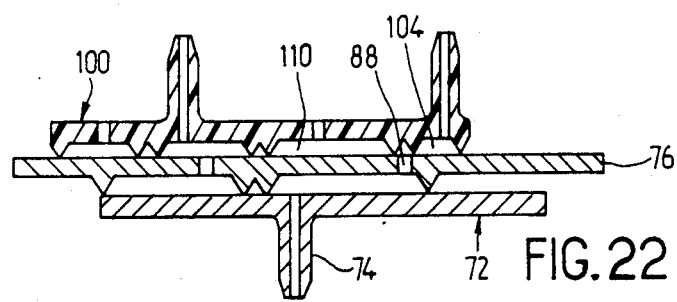
Figure 23:
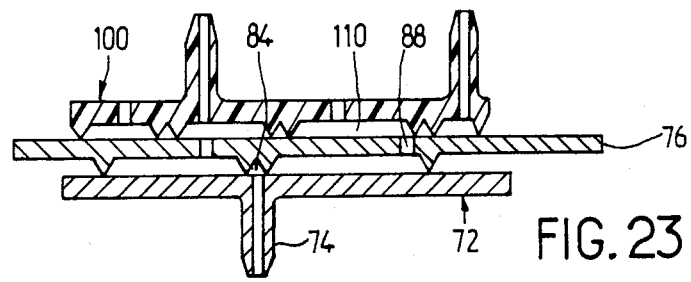
Figure 24:
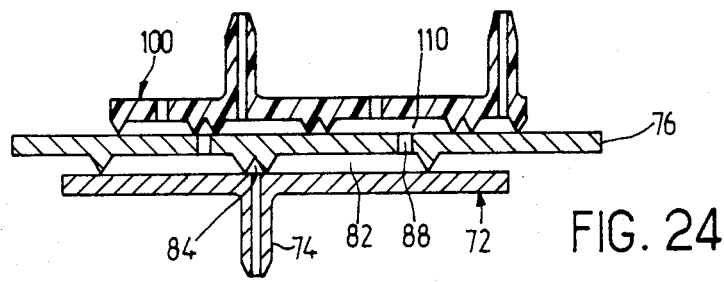
Figure 25:
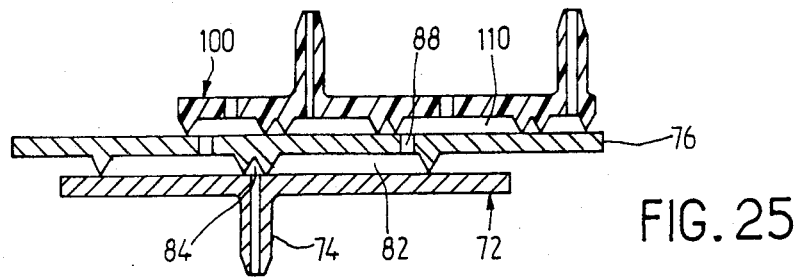

This tendency of the first plate 72 to move towards the right while the second plate 76 is being moved towards the left continues until the hole 88 of the second plate 76 opens out into the isolation zone formed between the chamber 104 and the chamber 110 (FIG. 22).

If the second plate 76 is moved further to the left (FIG. 23), the hole 88 through this plate opens out into the chamber 110 which is connected to the exhaust. The actuator is thus connected to the exhaust and displaces the first plate 72 to the left until the tubular end fitting 74 opens out into the isolation zone 84.

From this position, if the plate 76 is moved further to the left, the first plate 72 follows the displacement of the second plate 76 (FIGS. 24 and 25), until it returns to its initial limit position to the left, i.e. to the position shown in FIG. 17.

It can thus be seen that the slide valve shown in FIGS. 17 to 28 makes it possible to provide flap motion which is significantly depending on the direction of travel of the control means, and is not nearly the reciprocal of the motion performed for opposite movement of the control means.

I claim:

1. A device for controlling an actuator for displacing a moving member which is movable between two limit positions, the actuator being supplied with fluid under pressure by a slide valve comprising a first element connected to the piston rod of the actuator together with the moving member in order to be displaced in synchronism therewith, a second element mounted in sealed manner on the first element, control means for displacing the second element relative to the first element, with the first and second elements comprising generally planar overlying members defining two chambers therebetween which are separated from each other in sealed manner and which are suitable for being selectively connected to a source of fluid under pressure and to an exhaust via said second element, and which are also suitable for being connected to a feed duct for the actuator via said first element, the device including the improvement whereby the slide valve includes a fixed third element, said third element comprising a generally planar member overlying said second element and defining therewith at least two chambers which are separated from one another in sealed manner, at least one of which is permanently connected to a source of fluid under pressure and the other of which is permanently connected to the exhaust, via said third element.

2. A device according to claim 1, wherein the chambers defined between the first and second elements of the slide valve are connected to the chambers defined between the second and third elements of the slide valve by holes passing through the second element.

3. A device according to claim 1, wherein said chambers also include chambers which are isolated in sealed manner from the source of fluid under pressure and from the exhaust.

4. A device according to claim 1, wherein the moving elements of the slide valve are coaxial disks rotatably mounted about a common axis.

5. A device according to claim 4, wherein the second element of the slide valve constitutes the drive member for the second element of a second slide valve of the same type and suitable for controlling the displacement of a second moving member which is movable between two limit positions by means of a second actuator.

6. A device according to claim 5, wherein the peripheral surfaces of said second moving elements of said slide valves are provided with gear teeth which mesh with one another.

7. A device according to claim 1, wherein the moving member is a flap in an installation for heating and ventilating or air conditioning the cabin of a motor vehicle.

8. A device according to claim 1, wherein the displacement of the moving member is not proportional to the displacement of the second element of the corresponding slide valve.

9. A device according to claim 1, wherein the moving elements of the slide valve are displaceable in translation relative to one another in a predetermined direction.

* * * * *